US012791663B2

(12) United States Patent
Sakamoto et al.

(10) Patent No.: US 12,791,663 B2
(45) Date of Patent: Nov. 10, 2026

(54) INFORMATION PROCESSING METHOD, RADAR APPARATUS, AND RECORDING MEDIUM

(71) Applicant: FURUNO ELECTRIC CO., LTD., Hyogo (JP)

(72) Inventors: Masaki Sakamoto, Hyogo (JP); Masaya Nose, Hyogo (JP); Yuu Mizuhara, Tokyo (JP); Tetsu Yamashita, Tokyo (JP); Sei Iku, Tokyo (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 244 days.

(21) Appl. No.: 18/674,902

(22) Filed: May 26, 2024

(65) Prior Publication Data

US 2024/0310483 A1 Sep. 19, 2024

Related U.S. Application Data

(63) Continuation of application No. PCT/JP2022/015561, filed on Mar. 29, 2022.

(30) Foreign Application Priority Data

Dec. 2, 2021 (JP) ................................ 2021-196344

(51) Int. Cl.
*G01S 7/41* (2006.01)
*G01S 13/89* (2006.01)

(52) U.S. Cl.
CPC .............. *G01S 7/412* (2013.01); *G01S 13/89* (2013.01)

(58) Field of Classification Search
CPC .......... G01S 7/412; G01S 13/89; G01S 7/414; G01S 7/417
See application file for complete search history.

(56) References Cited

U.S. PATENT DOCUMENTS

2017/0254896 A1* 9/2017 Yamamoto .............. G01S 7/354
2018/0149731 A1* 5/2018 Goto ....................... G01S 7/412
(Continued)

FOREIGN PATENT DOCUMENTS

CN 112859012 B * 12/2023 ............... G01S 7/36
EP 3893020 10/2021
(Continued)

OTHER PUBLICATIONS

Z. Baird, M. K. Mcdonald, S. Rajan and S. J. Lee, "A CNN-LSTM Network for Augmenting Target Detection in Real Maritime Wide Area Surveillance Radar Data," in IEEE Access, vol. 8, pp. 179281-179294, 2020, doi: 10.1109/ACCESS.2020.3025144. (Year: 2020).*
(Continued)

*Primary Examiner* — Brady W Frazier
*Assistant Examiner* — Noah Yi Min Zhu
(74) *Attorney, Agent, or Firm* — JCIPRNET

(57) ABSTRACT

Provided is an information processing method in which: image data that includes time-series radar images is acquired; position data of a first false image candidate is acquired by inputting one acquired radar image into a first training model that outputs the position data of the first false image candidate when one radar image has been inputted; position data of a second false image candidate is acquired by inputting the acquired time-series radar images into a second training model that outputs the position data of the second false image candidate when the time-series radar images have been inputted; and a false image on a radar echo is detected on the basis of the position data of the acquired first false image candidate and second false image candidate.

6 Claims, 11 Drawing Sheets

(56) References Cited

U.S. PATENT DOCUMENTS

| | | | | |
|---|---|---|---|---|
| 2019/0204416 | A1* | 7/2019 | Yanagi | G01S 7/043 |
| 2019/0227156 | A1* | 7/2019 | Santra | G01S 13/42 |
| 2022/0189326 | A1* | 6/2022 | Hamminga | G01S 13/72 |
| 2023/0038842 | A1* | 2/2023 | Yu | G01S 13/584 |
| 2023/0110788 | A1* | 4/2023 | Shibata | G01S 13/872<br>342/59 |
| 2023/0168364 | A1* | 6/2023 | Podkamien | G01S 13/582<br>701/45 |
| 2024/0142600 | A1* | 5/2024 | Kubo | G01S 13/343 |

FOREIGN PATENT DOCUMENTS

| | | |
|---|---|---|
| JP | 3794641 | 7/2006 |
| JP | 2019074478 | 5/2019 |
| JP | 2021514886 | 6/2021 |
| WO | 2021015840 | 1/2021 |
| WO | 2021132437 | 7/2021 |
| WO | 2021161502 | 8/2021 |

OTHER PUBLICATIONS

P. Meiyan, S. Jun, Y. Yuhao, L. Dasheng and Y. Junpeng, "M-FCN based sea-surface weak target detection," in Journal of Systems Engineering and Electronics, vol. 32, No. 5, pp. 1111-1118, Oct. 2021, doi: 10.23919/JSEE.2021.000095. (Year: 2021).*

Y. Dai, Z. Wang, C. Chang and W. Chen, "Moving Target Detection in Sea Clutter Based on Deep Learning Methods," 2021 IEEE 6th International Conference on Signal and Image Processing (ICSIP), Nanjing, China, 2021, pp. 113-117, doi: 10.1109/ICSIP52628.2021.9688747. (Year: 2021).*

Chih-Ping Lin et al., "Detection of Targets Embedded in Sea Ice Clutter by means of MMW Radar Based on Fractal Dimensions, Wavelets, and Neural Classifiers", IEICE Transactions on Communications, Dec. 1, 1996, pp. 1818-1826, vol. E79-B, No. 12.

"International Search Report (Form PCT/ISA/210) of PCT/JP2022/015561", mailed on May 31, 2022, with English translation thereof, pp. 1-4.

* cited by examiner

| Position | False image | Accuracy |
|---|---|---|
| (R11, θ11) | Own ship-another chip | P11 |
| (R12, θ12) | Another ship-another ship | P12 |
| (R13, θ13) | Another ship-land | P13 |
| ⋮ | ⋮ | ⋮ |

| False image | Accuracy | Threshold value Th | Whether there is a target object at the position of the false image | Final determination |
|---|---|---|---|---|
| F1 | P1 | P1 > Th | No | False image |
| F2 | P2 | P2 > Th | Yes | Real image |
| F3 | P3 | P3 < Th | No | Neither a false image nor a real image |
| F4 | P4 | P4 < Th | Yes | Real image |

FIG. 9

INFORMATION PROCESSING METHOD, RADAR APPARATUS, AND RECORDING MEDIUM

CROSS-REFERENCE TO RELATED APPLICATION

The present application is a continuation of PCT/JP2022/015561, filed on Mar. 29, 2022, and is related to and claims priority from Japanese patent application no. 2021-196344, filed on Dec. 2, 2021. The entire contents of the aforementioned application are hereby incorporated by reference herein.

TECHNICAL FIELD

The disclosure relates to an information processing method, a radar apparatus, and a recording medium.

BACKGROUND

Navigation radar is an important apparatus that detects objects around one's own ship and provides information for safe and optimal avoidance actions. Patent Document 1 (Japanese Patent No. 3794641) discloses a technology in which an AIS apparatus of a ship equipped with an ARPA radar apparatus is connected to the ARPA radar apparatus via an interface, and which compares the received dynamic information of nearby ships and the radar symbol information acquired from the ARPA radar apparatus every moment and alerts the operator by using radar symbol information having no dynamic information recognized with a particular match as transmission stop warning information and using dynamic information having no radar symbol information recognized with a particular match as no situation report warning information.

A radar emits radio waves around the own ship and observes the reflected waves to display information on the orientation and distance of an object as a radar echo. However, on the other hand, the radio waves emitted to an object may be reflected by another object, generating a false image that does not actually exist.

At least one embodiment of the disclosure relates to an information processing method, a radar apparatus, and a recording medium that can recognize a false image on a radar echo.

SUMMARY

An information processing method according to an embodiment of the disclosure includes: acquiring image data that includes time-series radar images; inputting acquired one radar image to a first training model that outputs position data of a first false image candidate in response to one radar image being input, to acquire the position data of the first false image candidate; inputting acquired time-series radar images to a second training model that outputs position data of a second false image candidate in response to time-series radar images being input, to acquire the position data of the second false image candidate; and detecting a false image of a radar echo based on the acquired position data of the first false image candidate and the second false image candidate.

The information processing method according to an embodiment of the disclosure further includes: acquiring a detection result at a sensor unit that includes at least one of an AIS and an image sensor; and detecting the false image of the radar echo based on the acquired detection result, a probability regarding the position data of the first false image candidate output by the first training model, and a probability regarding the position data of the second false image candidate output by the second training model.

In the information processing method according to an embodiment of the disclosure, the first false image candidate includes a false image caused by at least one of a side lobe, a backwash, and a cloud.

In the information processing method according to an embodiment of the disclosure, the second false image candidate includes a false image caused by at least one of multiple reflections of a detection wave between an own ship and another ship, reflection between another ship and another ship, and reflection between another ship and land.

The information processing method according to an embodiment of the disclosure further includes differentiating a display mode according to whether the radar echo is a false image or not.

The information processing method according to an embodiment of the disclosure further includes differentiating a display mode of the false image based on a false image probability in response to the radar echo being a false image.

A radar apparatus according to an embodiment of the disclosure includes: processing circuitry configured to: acquire image data that includes time-series radar images; input acquired one radar image to a first training model that outputs position data of a first false image candidate in response to one radar image being input, to acquire the position data of the first false image candidate; input acquired time-series radar images to a second training model that outputs position data of a second false image candidate in response to time-series radar images being input, to acquire the position data of the second false image candidate; and detect a false image of a radar echo based on the acquired position data of the first false image candidate and the second false image candidate.

A non-transient computer-readable recording medium according to an embodiment of the disclosure records a computer program configured to enable a computer to perform processes of: acquiring image data that includes time-series radar images; inputting acquired one radar image to a first training model that outputs position data of a first false image candidate in response to one radar image being input, to acquire the position data of the first false image candidate; inputting acquired time-series radar images to a second training model that outputs position data of a second false image candidate in response to time-series radar images being input, to acquire the position data of the second false image candidate; and detecting a false image of a radar echo based on the acquired position data of the first false image candidate and the second false image candidate.

According to the disclosure, it is possible to recognize a false image on a radar echo.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 9 is a diagram showing an example of the final determination method for the false image.

DETAILED DESCRIPTION

Figure 1:
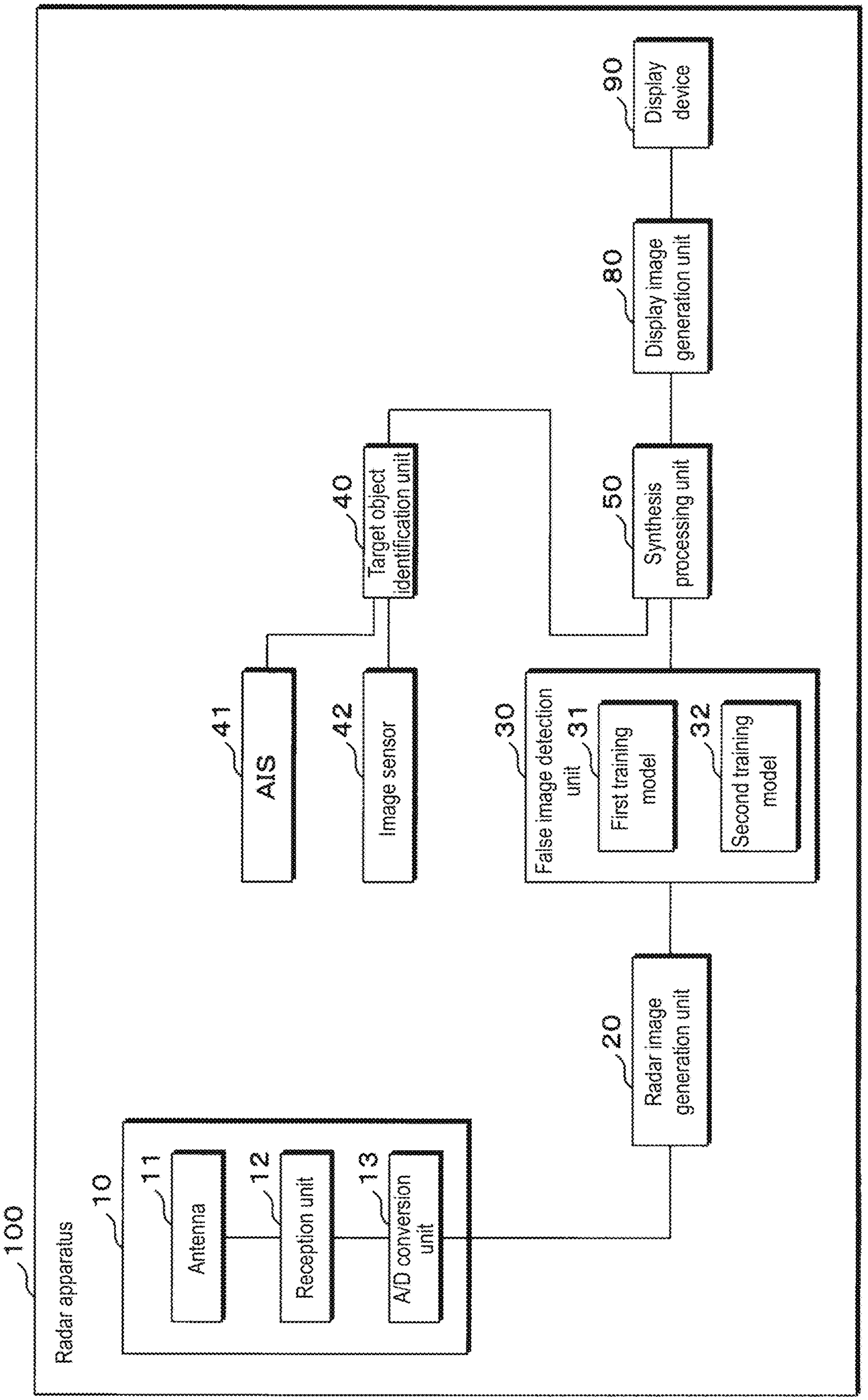
FIG. 1 is a diagram showing an example of the configuration of the radar apparatus.

Embodiments of the disclosure will be described hereinafter. FIG. 1 is a diagram showing an example of the configuration of a radar apparatus 100 including processing circuitry. The radar apparatus 100 includes an antenna unit 10, a radar image generation unit 20, a false image detection unit 30, a target object identification unit 40, an AIS (Automatic Identification System) 41, an image sensor 42, a synthesis processing unit 50, a display image generation unit 80, and a display device 90. Nevertheless, the target object identification unit 40, the AIS (Automatic Identification System) 41, and the image sensor 42 may be configured as devices separate from the radar apparatus 100. The antenna unit 10 includes an antenna 11, a reception unit 12, and an A/D conversion unit 13. The false image detection unit 30 includes a first training model 31 and a second training model 32. The AIS 41 and the image sensor 42 are also collectively referred to as a sensor unit.

The antenna 11 is a radar antenna that is capable of transmitting highly directional pulsed radio waves (transmission waves). The antenna 11 is configured to receive reflected waves from an object such as a target object. The radar apparatus 100 measures the time from when pulsed radio waves are transmitted until when reflected waves are received. Thereby, the radar apparatus 100 can detect the distance to the target object. The antenna 11 is configured to be rotatable 360° on a horizontal plane. The antenna 11 is configured to repeatedly transmit and receive radio waves at particular intervals while changing the transmission direction of the pulsed radio waves (while changing the antenna angle). Thereby, the radar apparatus 100 can detect a target object on a plane around the own ship over 360°.

Figure 2:
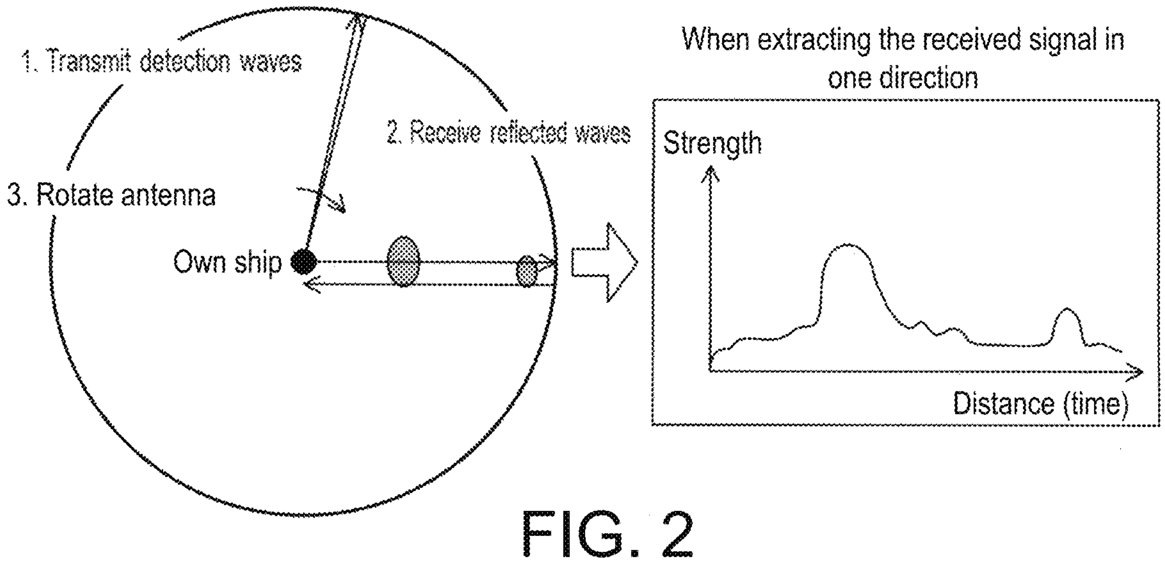
FIG. 2 is a diagram showing an example of the echo signal.

FIG. 2 is a diagram showing an example of an echo signal. As shown in FIG. 2, the radar apparatus 100 on the own ship transmits detection waves in a certain direction and receives reflected waves. When the reflected waves are received, the antenna rotates to repeat the same process of transmitting detection waves and receiving reflected waves. The same process is repeated over 360 degrees around the own ship. One image is generated after the antenna rotates 360 degrees. When a received signal (echo signal) in one direction is extracted, the strength of the received signal is obtained according to the distance from the own ship. It is known that an object exists at a distance where the signal strength is high. It is assumed that a target object is an object that actually exists such as another ship, and a false image is an object that does not actually exist.

The reception unit 12 detects and amplifies the echo signal obtained from the reflected waves received by the antenna 11, and outputs the amplified echo signal to the A/D conversion unit 13. The A/D conversion unit 13 samples the echo signal in analog form and converts the echo signal into digital data (echo data) composed of multiple bits. Here, the echo data includes data specifying the strength (signal level) of the echo signal obtained from the reflected waves received by the antenna 11. The A/D conversion unit 13 outputs the echo data to the radar image generation unit 20.

The radar image generation unit 20 generates a radar image based on the echo data output from the A/D conversion unit 13.

Figure 3:
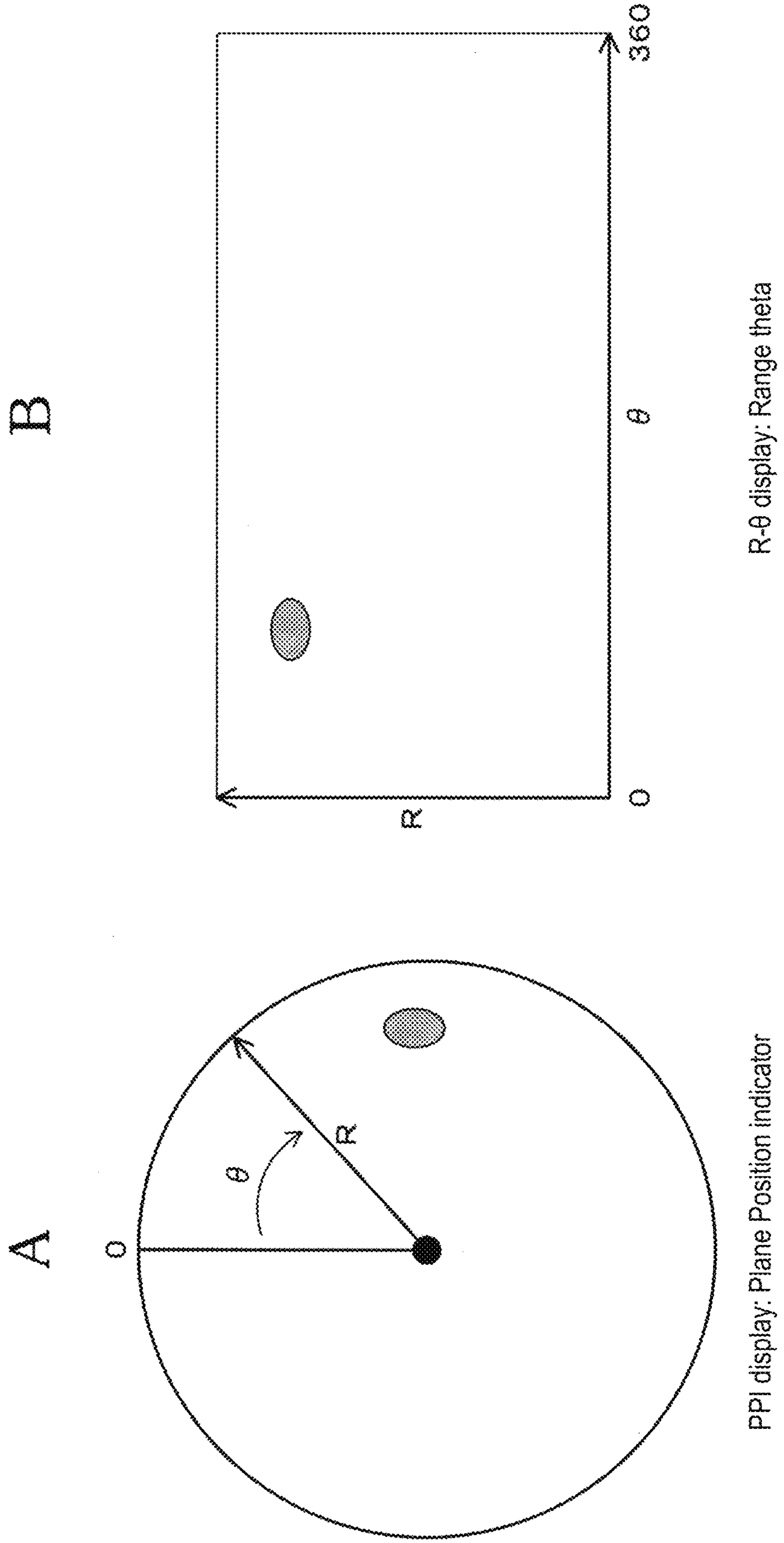
FIG. 3 is a diagram showing an example of the radar image.

FIG. 3 is a diagram showing an example of the radar image. A of FIG. 3 is a radar image displayed in PPI (Plane Position Indicator), and is a radar image over 360 degrees in the horizontal direction centered on the own ship position. The radar image generation unit 20 includes an R-θ conversion unit, and can convert a radar image displayed in PPI into a radar image displayed in R-θ (Range theta) as shown in B of FIG. 3. In the radar image displayed in R-θ, the vertical axis shows the distance from the own ship, and the horizontal axis shows the orientation (from 0 to 360 degrees). The radar image generation unit 20 outputs the radar image displayed in R-θ to the false image detecting unit 30. In addition, a radar image displayed in R-θ (Range theta) may be generated from the echo data output from the A/D conversion unit 13 without generating a radar image displayed in PPI.

Next, the mechanism by which a false image occurs will be explained.

Figure 4:
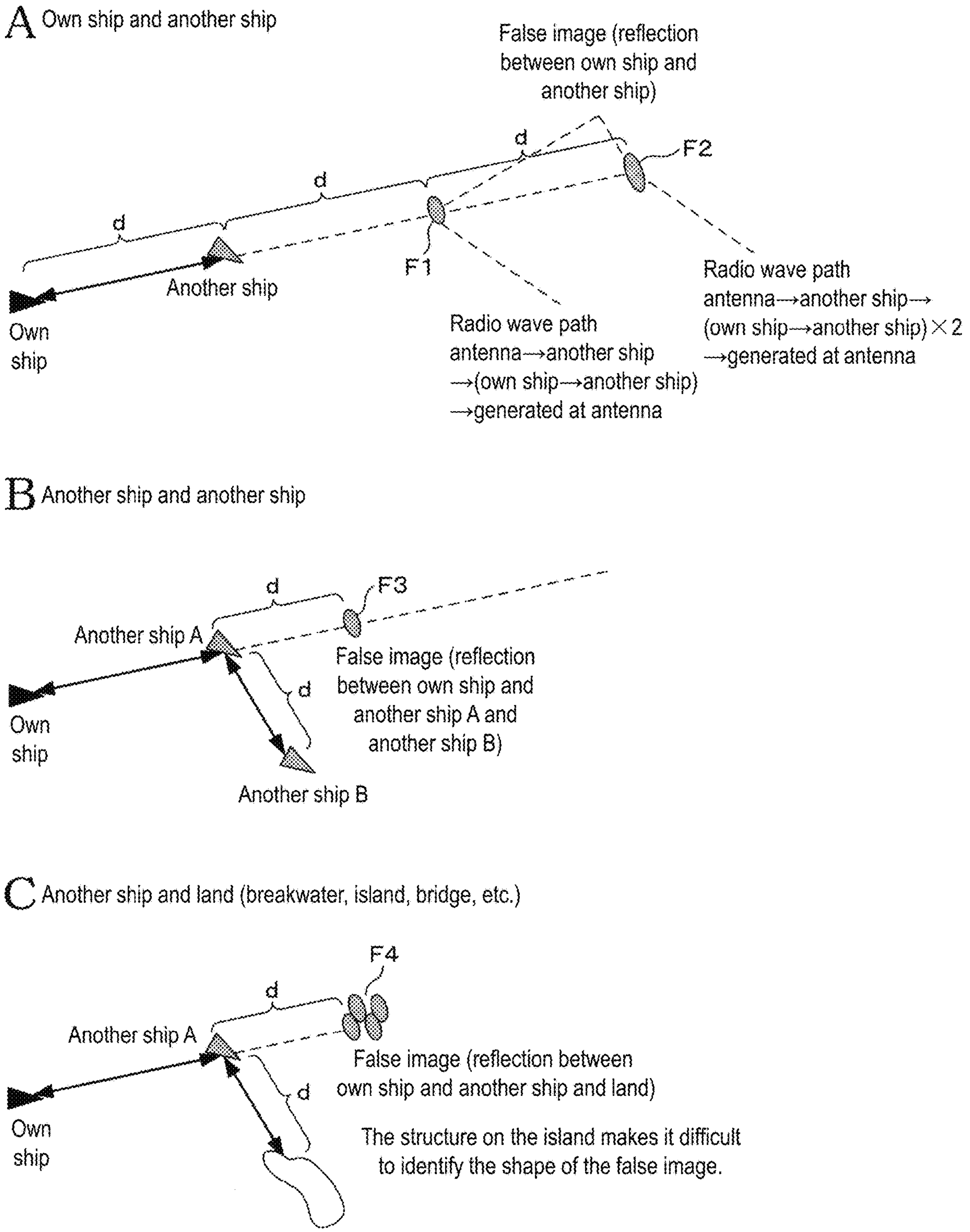
FIG. 4 is a diagram showing an example of the occurrence of the false image.

FIG. 4 is a diagram showing an example of the occurrence of a false image. A of FIG. 4 shows how a false image occurs between the own ship and another ship. When the radio waves emitted from the antenna on the own ship are reflected by another ship, the reflected waves are reflected by the own ship, and the reflected waves are reflected by another ship and received by the antenna, on the radar echo, an object exists at a position indicated by the symbol F1. However, since there is actually no target object (another ship), a false image is generated at the position of the symbol F1. Similarly, in the case where reflection is repeated twice between the own ship and another ship, a false image is generated at a position of the symbol F2. Thus, false images occur due to the reflection (including multiple reflections) of radio waves between the own ship and another ship.

B of FIG. 4 shows how a false image occurs between another ship and another ship. As shown in B of FIG. 4, another ship A and another ship B exist around the own ship. When the radio waves emitted from the antenna on the own ship are reflected by another ship A, the reflected waves are reflected by another ship B, and the reflected waves are reflected by another ship A and received by the antenna, on the radar echo, an object exists at a position indicated by the symbol F3. However, since there is actually no target object (another ship), a false image is generated at the position of the symbol F3. Thus, false images occur due to the reflection of radio waves between another ship and another ship.

C of FIG. 4 shows how a false image occurs between another ship and land. As shown in C of FIG. 4, another ship A and land (including, for example, a structure or the like on an island) exist around the own ship. When the radio waves emitted from the antenna on the own ship are reflected by another ship A, the reflected waves are reflected by the structure on the land, and the reflected waves are reflected by another ship A and received by the antenna, on the radar echo, an object exists at a position indicated by the symbol F4. However, since there is actually no target object (another ship), a false image is generated at the position of the symbol F4. Thus, false images occur due to the reflection of radio waves between another ship and land.

False images are also caused by a side lobe, a backwash, a cloud, etc. The side lobe is a portion where the radio wave strength is weaker than the main lobe where the strength of the radio waves emitted from the antenna is maximum, and is a leakage radio wave that is emitted in a direction different from the direction of the main lobe by, for example, 30 to 45 degrees. The backwash is a wave that occurs behind a ship when sailing. Generally, radar echoes of a backwash and a cloud are not false images, but here they are treated as a type of false image as radar echoes that are not subject to avoidance.

Next, a method for detecting a false image will be explained.

Figure 5:
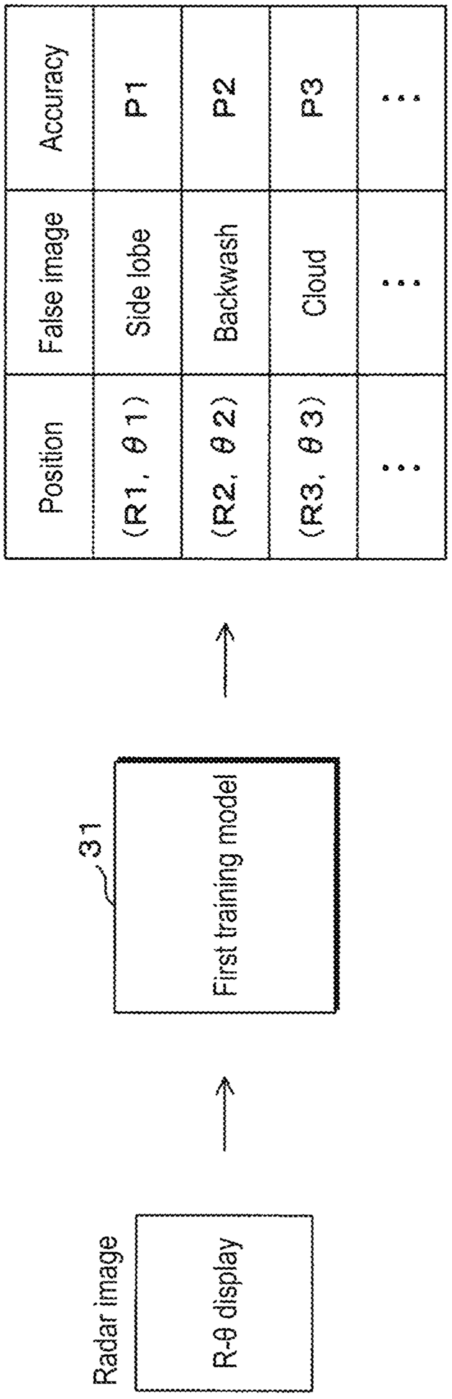
FIG. 5 is a diagram showing an example of the false image detection using the first training model.

FIG. 5 is a diagram showing an example of the false image detection using a first training model 31. As shown in FIG. 5, when one radar image displayed in R-θ is input to the first training model 31, the first training model 31 outputs position data of false image and the accuracy thereof regarding the false image (first false image candidate) caused by a side lobe, a backwash, and a cloud. The position data of false image has area information. The first training model 31 can use semantic segmentation using deep learning, and can estimate a class label (for example, label 1: side lobe, label 2: backwash, and label 3: cloud) for all the pixels in the radar image. For example, a plurality of pixels estimated to be a side lobe may be combined into one pixel group, and the center position of the pixel group may be set as the position of the side lobe. For false images on a radar echo, the pixel group can be treated as one false image. Further, the accuracy of the false image is obtained by averaging the accuracy of each pixel estimated to be a side lobe. The first training model 31 may use a fully convolutional network (FCN), an encoder-decoder structure model, YOLO (You Only Look Once), or the like.

Figure 6:
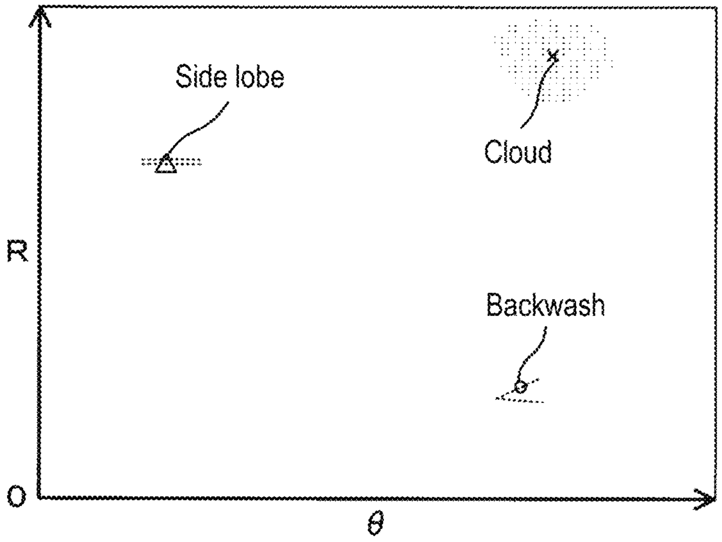
FIG. 6 is a diagram showing the first example of the false image.

FIG. 6 is a diagram showing the first example of a false image. FIG. 6 shows a false image on a radar image. As shown in FIG. 6, a false image caused by a side lobe is often displayed in a straight line in R-θ display. The symbol Δ is the center of the false image and indicates the position of the false image. A false image caused by a backwash often appears distorted in a V-shape. The symbol O is the center of the false image and indicates the position of the false image. In addition, the symbol O may be attached to both V-shaped false images. A false image caused by a cloud is often relatively vague, and the area of the false image is often relatively large. The symbol X is the center of the false image and indicates the position of the false image. It should be noted that the false images shown in FIG. 6 are schematic illustrations, and may differ from the actual false images on a radar echo.

The first training model 31 can be generated, for example, as follows. That is, in the case where one radar image displayed in R-θ is input to the first training model 31, the first training model 31 may be generated so as to output the position data of a first false image candidate. Specifically, for the radar image displayed in R-θ, an image in which a false image that is definitely confirmed to be a false image is annotated, as shown in FIG. 6, is prepared as teacher data. Then, a large number of sets of radar images displayed in R-θ and corresponding teacher data are collected as training data. The teacher data is, for example, radar images displayed in R-θ, to which class labels are attached, such as label 1: side lobe, label 2: backwash, and label 3: cloud. The first training model 31 can be generated by adjusting the parameters of the first training model 31 based on the training data so that the value of the loss function, which is based on the position data of the false image output by the first training model 31 by inputting the radar image displayed in R-θ to the first training model 31 and the position data of the false image included in the training data, is minimized.

Figure 7:
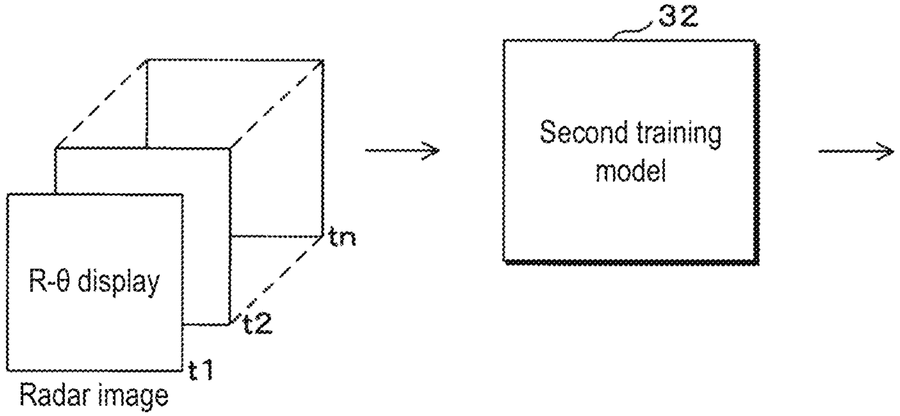
FIG. 7 is a diagram showing an example of the false image detection using the second training model.

FIG. 7 is a diagram showing an example of the false image detection using a second training model 32. As shown in FIG. 7, when radar images of a time series (t1, t2, . . . , tn) displayed in R-θ are input to the second training model 32, the second training model 32 outputs position data of false images and the accuracy thereof regarding the false image (second false image candidate) caused by reflection between own ship and another ship, reflection between another ship and another ship, and reflection between another ship and land. When the radar rotates once, one radar image displayed in R-θ is generated. The time series (t1, t2, . . . , tn) may be points in time each time the radar rotates, or may be points in time each time the radar rotates multiple times. The number of the time-series radar images may be determined as appropriate, such as 10, 20, 30, etc., for example. Similarly to the first training model 31, the second training model 32 can also utilize semantic segmentation using deep learning, and can estimate a class label (for example, label 1: reflection between own ship and another ship, label 2: reflection between another ship and another ship, and label 3: reflection between another ship and land) for all the pixels in the radar image. For example, a plurality of pixels estimated to be reflection between own ship and another ship may be combined into one pixel group, and the center position of the pixel group may be set as the position of the false image due to reflection between own ship and another ship. For false images on a radar echo, the pixel group can be treated as one false image. Further, the accuracy of the false image is obtained by averaging the accuracy of each pixel estimated to be reflection between own ship and another ship. By inputting the time-series radar images, in the second training model 32, it is possible to take into consideration the temporal behaviors of the positional relationships between own ship and another ship, between another ship and another ship, and between another ship and land, and to accurately detect false images caused by reflection between own ship and another ship, reflection between another ship and another ship, and reflection between another ship and land. The second training model 32 may use a recurrent neural network (RNN)-based model, an ALSTM (Attention Long Short Term Memory), a Transformer, or the like.

Figure 8:
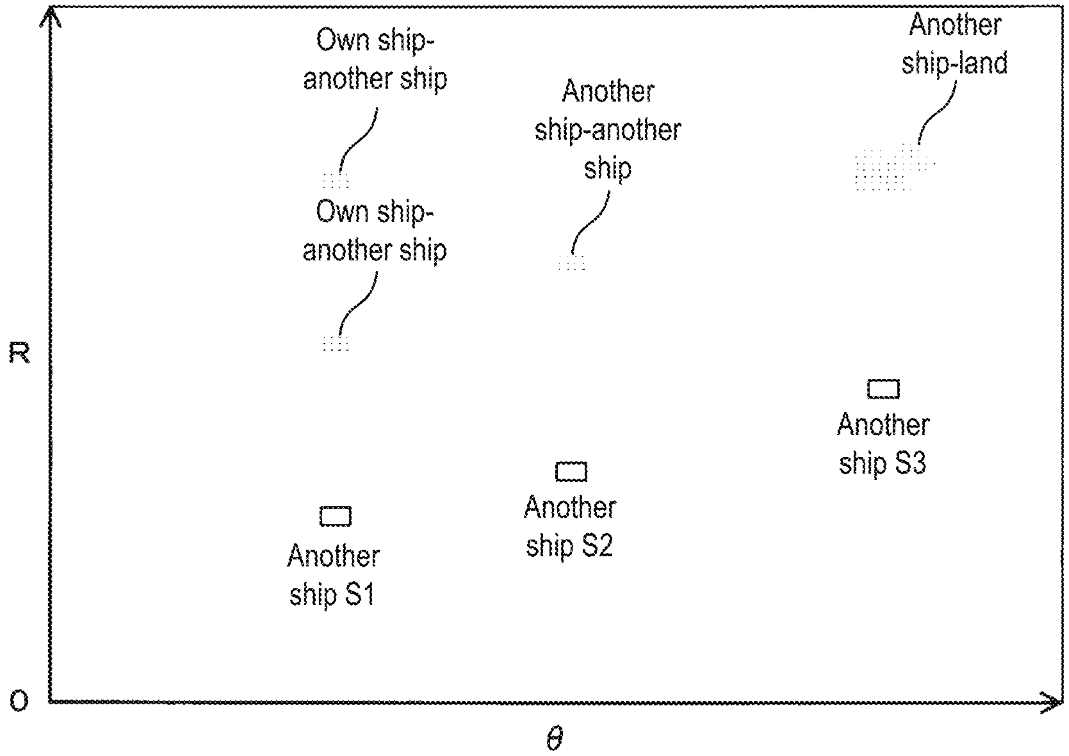
FIG. 8 is a diagram showing the second example of the false image.

FIG. 8 is a diagram showing the second example of a false image. FIG. 8 displays a false image on a radar image. As shown in FIG. 8, a false image caused by reflection between own ship and another ship is often displayed on an extension line between the own ship and another ship S1 in R-θ display. In this case, the false image is generated due to reflection between the own ship and another ship S1. A false image caused by reflection between another ship and another ship is displayed on an extension line between the own ship and another ship S2. In this case, the false image is generated due to reflection between another ship S2 and another ship S1. A false image caused by reflection between another ship and land is displayed on an extension line between the own ship and another ship S3. In this case, the false image is generated due to reflection between another ship S3 and land. A false image represents a collection of pixels, and the center of the pixel group is the position of the false image.

It should be noted that the false images shown in FIG. 8 are schematic illustrations, and may differ from the actual false images on a radar echo.

The second training model 32 can be generated, for example, as follows. That is, in the case where time-series radar images displayed in R-θ are input to the second training model 32, the second training model 32 may be generated so as to output the position data of a second false image candidate. Specifically, for the time-series radar images displayed in R-θ, an image in which a false image that is definitely confirmed to be a false image is annotated, as shown in FIG. 8, is prepared as teacher data. The teacher data is, for example, radar images displayed in R-θ to which class labels are attached, such as label 1: reflection between own ship and another ship, label 2: reflection between another ship and another ship, and label 3: reflection between another ship and land. Then, a large number of sets of time-series radar images displayed in R-θ and corresponding teacher data are collected as training data. The second training model 32 can be generated by adjusting the parameters of the second training model 32 based on the training data so that the value of the loss function, which is based on the position data of the false image output by the second training model 32 by inputting the time-series radar images displayed in R-θ to the second training model 32 and the position data of the false image included in the training data, is minimized.

As described above, the radar apparatus 100 acquires image data including time-series radar images; inputs the acquired one radar image to the first training model 31 that outputs the position data of the first false image candidate in the case where one radar image is input, to acquire the position data of the first false image candidate; inputs the acquired time-series radar images to the second training model 32 that outputs the position data of the second false image candidate in the case where the time-series radar images are input, to acquire the position data of the second false image candidate; and detects a false image of a radar echo based on the acquired position data of the first false image candidate and the second false image candidate, thereby making it possible to recognize a false image on a radar echo.

The AIS 41 is a communication device that can receive AIS data from another ship that exists around the own ship. The AIS data includes data such as identification code, ship name, position, course, ship speed, and destination. The AIS 41 outputs the AIS data to the target object identification unit 40. It should be noted that the disclosure is not limited to AIS, and may use VDES (VHF Data Exchange System).

The image sensor 42 can be configured with a visible light camera or an infrared camera, for example. The image sensor 42 photographs the outside of the ship and generates an image. The image sensor 42 may be installed, for example, on the bridge of the own ship to face toward the bow direction. The image sensor 42 may be configured to pan (swing in the horizontal direction), tilt (swing in the vertical direction), and zoom in response to an operation of the user. The image sensor 42 outputs image data to the target object identification unit 40.

The target object identification unit 40 uses at least one of the AIS data output by the AIS 41 and the image data output by the image sensor 42 to identify a target object which is an object that actually exists (another ship, etc.). The position of the target object can be identified, for example, by the relative position in terms of distance and orientation from the own ship, or the absolute position in terms of latitude and longitude. In the case of identifying a target object based on image data, the target object identification unit 40 may use a training model generated by machine learning. In this case, the training model can use an object detection model such as YOLO (You Only Look Once) or SSD (Single Shot Multibox Detector).

The synthesis processing unit 50 makes a final determination as to whether the false image detected by the false image detection unit 30 is a false image or a real image (target object) rather than a false image, based on the detection result detected by the false image detection unit 30 and the identification result identified by the target object identification unit 40. The determination method performed by the synthesis processing unit 50 will be described below.

FIG. 9 is a diagram showing an example of a final determination method for a false image. The detection results detected by the false image detection unit 30 are assumed to be false images F1 to F4, and the accuracy thereof is assumed to be P1 to P4, respectively. As shown in FIG. 9, the accuracy P1 of the false image F1 exceeds a threshold value Th, and there is a high possibility that the false image F1 is a false image. Further, since there is no target object identified by the target object identification unit 40 at the position of the false image, the false image F1 is finally determined to be a false image. As for the false image F2, the accuracy P2 exceeds the threshold value Th and there is a high possibility that the false image F2 is a false image, but since there is a target object identified by the target object identification unit 40 at the position of the false image, the false image F2 is finally determined to be a real image (not a false image). As for the false image F3, the accuracy P3 is below the threshold value Th, and there is a low possibility that the false image F3 is a false image. Since there is no target object identified by the target object identification unit 40 at the position of the false image, the false image F3 is determined to be neither a false image nor a real image. In this case, the false image F3 may be finally determined to be a false image. As for the false image F4, the accuracy P4 is below the threshold value Th, and there is a low possibility that the false image F4 is a false image. Further, since there is a target object identified by the target object identification unit 40 at the position of the false image, the false image F4 is finally determined to be a real image. It should be noted that the final determination method is not limited to the example shown in FIG. 9.

As described above, the radar apparatus 100 may acquire the detection result (identification result) at the sensor unit including at least one of the AIS 41 and the image sensor 42, and detect a false image on a radar echo based on the acquired detection result, the probability (accuracy) regarding the position data of the first false image candidate output by the first training model 31, and the probability regarding the position data of the second false image candidate output by the second training model, thereby making it possible to further improve the accuracy of detecting a false image.

The display image generation unit 80 generates a display image to be displayed on the display device 90 based on the radar image generated by the radar image generation unit 20 and the final determination result of the synthesis processing unit 50. The display image includes, for example, an electronic nautical chart.

Figure 10:
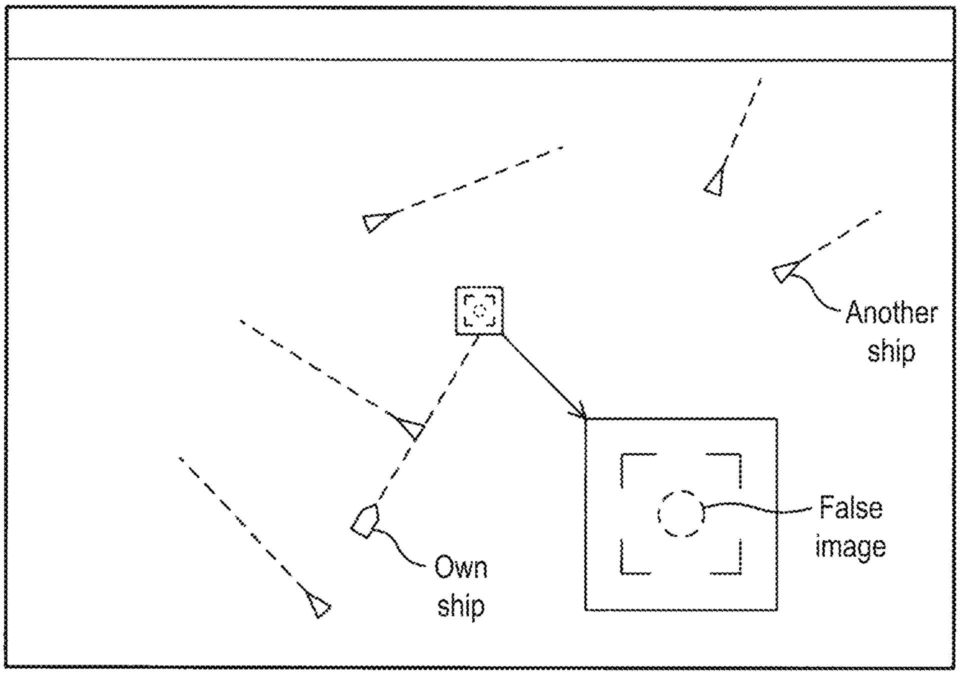
FIG. 10 is a diagram showing an example of the display image.

FIG. 10 is a diagram showing an example of the display image. As shown in FIG. 10, the display image displays an extensive nautical chart of the course direction of the own ship, and displays the positions and course directions of other ships around. In order to avoid coming close to other ships, the own ship navigates autonomously by specifying other ships approaching in the course direction of the own ship as avoidance targets. In the drawing, the symbol of the object determined to be a false image is indicated by a dashed circle, and the false image is excluded from the avoidance target. In this way, the radar apparatus 100 can differentiate the display mode depending on whether the radar echo has a false image. In the illustrated example, the false image is displayed as a dashed circle to be distinguished from other ships (target objects), but the disclosure is not limited thereto, and the color of the false image may be changed. Furthermore, the false image may be deleted from the nautical chart and hidden. Thereby, it is easy to recognize the avoidance target. In addition, in the case where the radar echo has a false image, the display image generation unit 80 may differentiate the display mode of the false image based on the false image probability. For example, an object that is more likely to be a false image may be displayed in a brighter or more conspicuous color. Thereby, it is possible to visualize the certainty of the false image.

Figure 11:
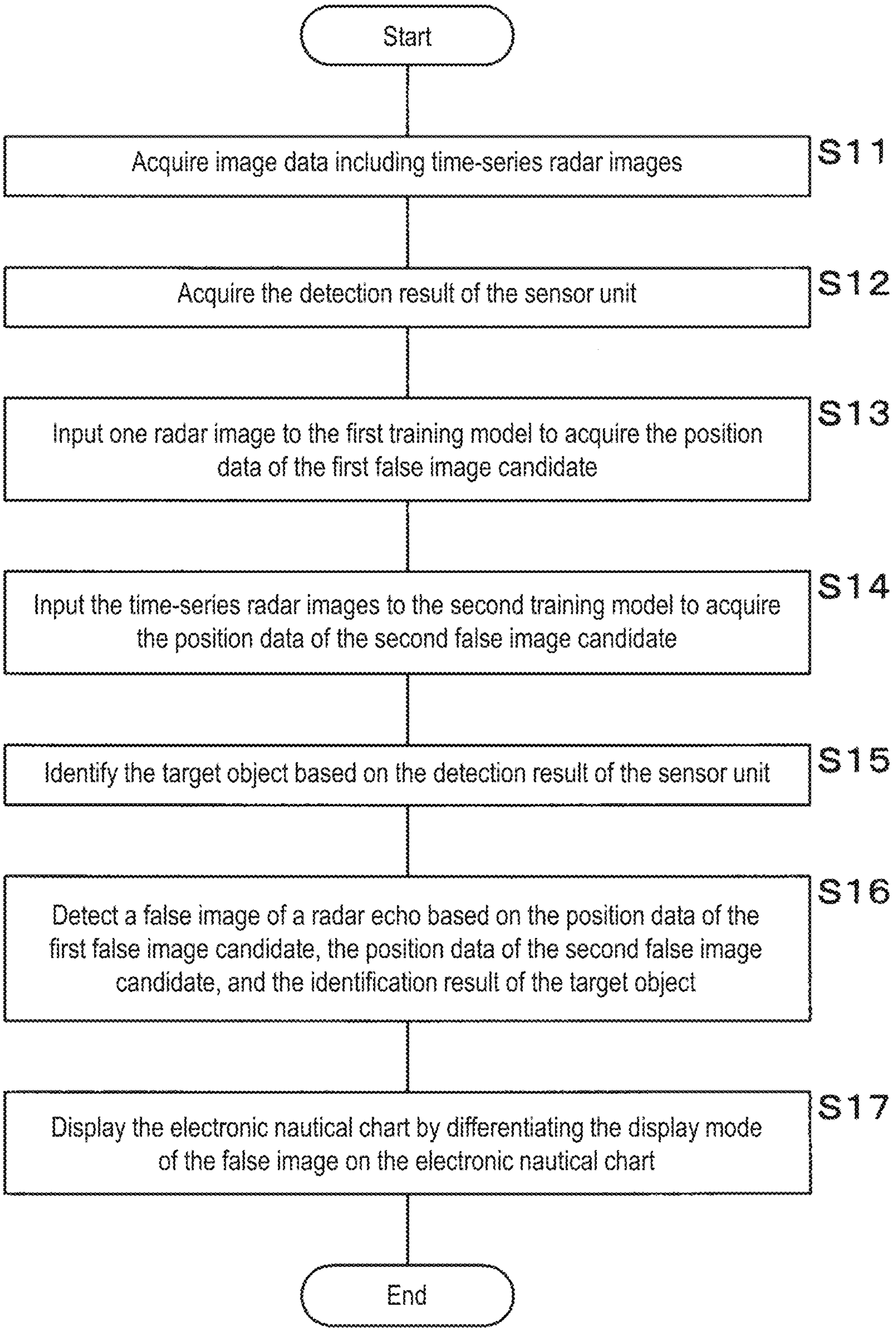
FIG. 11 is a diagram showing an example of the processing procedure of the radar apparatus.

FIG. 11 is a diagram showing an example of the processing procedure of the radar apparatus 100. The radar apparatus 100 acquires image data including time-series radar images (S11), and acquires the detection result of the sensor unit (S12). The radar apparatus 100 inputs one radar image to the first training model 31 to acquire the position data of the first false image candidate (S13). The first false image candidate includes a false image caused by at least one of a side lobe, a backwash, and a cloud.

The radar apparatus 100 inputs the time-series radar images to the second training model 32 to acquire the position data of the second false image candidate (S14). The second false image candidate includes a false image caused by at least one of multiple reflections of the detection wave between the own ship and another ship, reflection between another ship and another ship, and reflection between another ship and land. The radar apparatus 100 identifies the target object based on the detection result of the sensor unit (S15).

The radar apparatus 100 detects a false image of a radar echo based on the position data of the first false image candidate, the position data of the second false image candidate, and the identification result of the target object (S16). In step S16, the determination method illustrated in FIG. 9 may be used. Before performing the process of step S16, the processes of steps S11 to S15 may be repeated as appropriate. The radar apparatus 100 displays the electronic nautical chart with the display mode of the false image on the electronic nautical chart different from the display mode of the target object (S17), and ends the processing.

All or some of the radar image generation unit 20, the false image detection unit 30, the target object identification unit 40, the synthesis processing unit 50, and the display image generation unit 80 of the radar apparatus 100 can also be implemented using a computer equipped with a CPU (processor), a RAM, etc. Each of the above units of the radar apparatus 100 can be implemented on a computer by loading a computer program (recordable on a recording medium) that defines the processing procedure shown in FIG. 11 into the RAM provided in the computer and executing the computer program on the CPU (processor).

The information processing method of this embodiment includes: acquiring image data that includes time-series radar images; inputting acquired one radar image to a first training model that outputs position data of a first false image candidate in response to one radar image being input, to acquire the position data of the first false image candidate; inputting acquired time-series radar images to a second training model that outputs position data of a second false image candidate in response to time-series radar images being input, to acquire the position data of the second false image candidate; and detecting a false image of a radar echo based on the acquired position data of the first false image candidate and the second false image candidate.

The information processing method of this embodiment further includes: acquiring a detection result at a sensor unit that includes at least one of an AIS and an image sensor; and detecting the false image of the radar echo based on the acquired detection result, a probability regarding the position data of the first false image candidate output by the first training model, and a probability regarding the position data of the second false image candidate output by the second training model.

In the information processing method of this embodiment, the first false image candidate includes a false image caused by at least one of a side lobe, a backwash, and a cloud.

In the information processing method of this embodiment, the second false image candidate includes a false image caused by at least one of multiple reflections of a detection wave between an own ship and another ship, reflection between another ship and another ship, and reflection between another ship and land.

The information processing method of this embodiment further includes differentiating a display mode according to whether the radar echo is a false image or not.

The information processing method of this embodiment further includes differentiating a display mode of the false image based on a false image probability in response to the radar echo being a false image.

The radar apparatus of this embodiment includes: a data acquisition unit which acquires image data that includes time-series radar images; a first acquisition unit which inputs acquired one radar image to a first training model that outputs position data of a first false image candidate in response to one radar image being input, to acquire the position data of the first false image candidate; a second acquisition unit which inputs acquired time-series radar images to a second training model that outputs position data of a second false image candidate in response to time-series radar images being input, to acquire the position data of the second false image candidate; and a detection unit which detects a false image of a radar echo based on the acquired position data of the first false image candidate and the second false image candidate.

The computer program of this embodiment is configured to enable a computer to perform processes of: acquiring image data that includes time-series radar images; inputting acquired one radar image to a first training model that outputs position data of a first false image candidate in response to one radar image being input, to acquire the position data of the first false image candidate; inputting acquired time-series radar images to a second training model that outputs position data of a second false image candidate in response to time-series radar images being input, to acquire the position data of the second false image candidate; and detecting a false image of a radar echo based on the acquired position data of the first false image candidate and the second false image candidate.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An information processing method, comprising:

acquiring image data that comprises time-series radar images;

inputting one radar image included in the acquired time-series radar images to a first training model that outputs position data of a first false image candidate in response to the one radar image being input, to acquire the position data of the first false image candidate, wherein the first false image candidate comprises a false image caused by at least one of a side lobe, a backwash, and a cloud;

inputting the acquired time-series radar images to a second training model that outputs position data of a second false image candidate in response to the time-series radar images being input, to acquire the position data of the second false image candidate, wherein the second false image candidate comprises a false image caused by at least one of multiple reflections of a detection wave between an own ship and another ship, reflection between another ship and another ship, and reflection between another ship and land; and detecting a false image of a radar echo based on the acquired position data of the first false image candidate and the second false image candidate.

2. The information processing method according to claim 1, further comprising:

acquiring a detection result at a sensor unit that comprises at least one of an Automatic Identification System (AIS) and an image sensor; and detecting the false image of the radar echo based on the acquired detection result, a probability regarding the position data of the first false image candidate output by the first training model, and a probability regarding the position data of the second false image candidate output by the second training model.

3. The information processing method according to claim 1, further comprising differentiating a display mode according to whether the radar echo is a false image or not.

4. The information processing method according to claim 1, further comprising differentiating a display mode of the false image based on a false image probability in response to the radar echo being a false image.

5. A radar apparatus, comprising:

processing circuitry configured to:

acquire image data that comprises time-series radar images;

input one radar image included in the acquired time-series radar images to a first training model that outputs position data of a first false image candidate in response to the one radar image being input, to acquire the position data of the first false image candidate, wherein the first false image candidate comprises a false image caused by at least one of a side lobe, a backwash, and a cloud;

input the acquired time-series radar images to a second training model that outputs position data of a second false image candidate in response to the time-series radar images being input, to acquire the position data of the second false image candidate, wherein the second false image candidate comprises a false image caused by at least one of multiple reflections of a detection wave between an own ship and another ship, reflection between another ship and another ship, and reflection between another ship and land; and detect a false image of a radar echo based on the acquired position data of the first false image candidate and the second false image candidate.

6. A non-transient computer-readable recording medium, recording a computer program configured to enable a computer to perform processes of:

acquiring image data that comprises time-series radar images;

inputting one radar image included in the acquired time-series radar images to a first training model that outputs position data of a first false image candidate in response to the one radar image being input, to acquire the position data of the first false image candidate, wherein the first false image candidate comprises a false image caused by at least one of a side lobe, a backwash, and a cloud;

inputting the acquired time-series radar images to a second training model that outputs position data of a second false image candidate in response to the time-series radar images being input, to acquire the position data of the second false image candidate, wherein the second false image candidate comprises a false image caused by at least one of multiple reflections of a detection wave between an own ship and another ship, reflection between another ship and another ship, and reflection between another ship and land; and detecting a false image of a radar echo based on the acquired position data of the first false image candidate and the second false image candidate.

* * * * *